Patented June 24, 1930

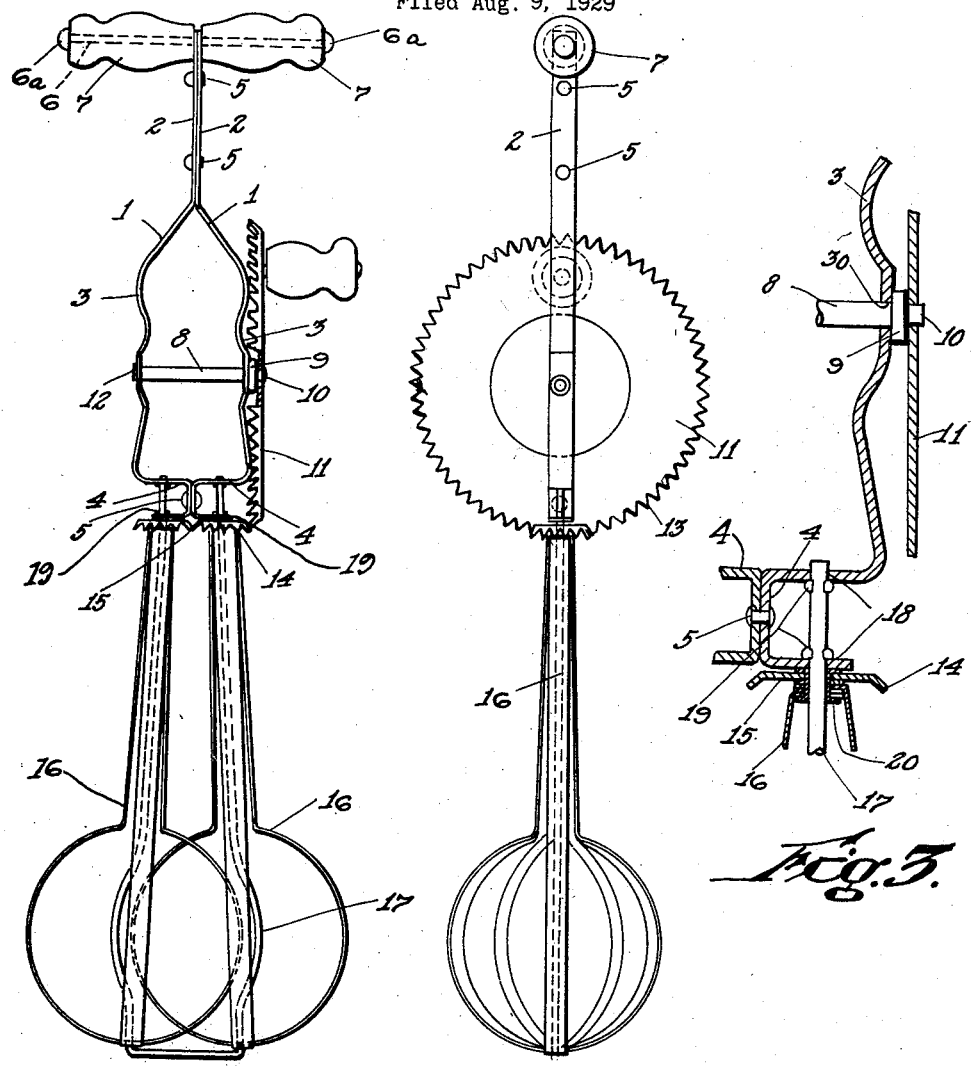

1,767,454

UNITED STATES PATENT OFFICE

SAMUEL T. HOBBS, OF WORCESTER, MASSACHUSETTS, ASSIGNOR TO THE WASHBURN COMPANY, OF WORCESTER, MASSACHUSETTS, A CORPORATION OF MASSACHUSETTS

EGGBEATER

Application filed August 9, 1929. Serial No. 384,668

The present invention relates to egg beaters and particularly to hand operated beaters of the type in which a pair of beating elements may be simultaneously rotated in opposite directions by turning a gear wheel by hand.

The object of the present invention is to provide a beater of the above described type in which the operating parts are so formed and arranged that the surfaces thereof may be readily cleaned, and the beater kept in a hygienic condition. A further object of the invention is to provide a beater constructed of members which may be cheaply and easily made from pressed metal, and which when assembled together will provide a strong and durable structure easy to operate. The above and other advantageous features of the invention will hereinafter more fully appear, reference being had to the accompanying drawings, in wihch:—

Fig. 1 is a view in side elevation of an egg beater embodying the invention.

Fig. 2 is a view of the parts shown in Fig. 1 turned through an angle of 90°.

Fig. 3 is a fragmentary sectional view on an enlarged scale showing the mode of attaching a beater assembly to the frame of the beater.

Like reference characters refer to like parts in the different figures.

Referring to the drawings, the beater comprises frame members 1, 1, preferably formed from metal strip, the frame members being identical in construction so that any two of them may be secured together to provied a complete frame. Each frame member 1 provides a straight shank portion 2 from which it extends sidewise and downwardly at 3 and then back on itself to provide a U-shaped terminal portion 4. In assembling an egg beater, a pair of identical frame members 1 are placed together with their shank portions 2 in contact and their terminal portions 4 oppositely disposed, after which the frame members are secured together by rivets 5, 5 along the portions 2 and at the point where the bases of the U-shaped portions 4 are in engagement. This provides a very rigid frame and a handle is provided at the top of the frame by a horizontal rod 6 extending through the joined portions 2, on which are mounted oppositely disposed wooden grips 7, 7 held on the rod 6 by heads $6^a$. The grips 7 provide smooth surfaces whereby the frame of the egg beater may be conveniently held without possibility of chafing the hands of the user.

The spaced side portions 3, 3 of the opposed frame members 1 serve to support between them a shaft 8 provided at one end with a shoulder 9 beyond which is provided a reduced shaft portion 10 on which is pressed a gear 11. The shaft 8 is held from endwise movement between the spaced frame portions 3 by riveting over its end opposite the shoulder 9, as indicated at 12, the shaft 8 being freely rotatable with the gear 11 within the openings $3^a$ of the frame. The gear 11 is preferably formed from sheet metal, the teeth 13 around the periphery thereof being bent from the plane of the gear blank at an angle of approximately 35° so as to mesh with the teeth 14 of one of a pair of similar meshing pinions 15 carried by the beating elements 16, as will next be described.

The beating elements 16 are rotatable upon a wire beater frame 17 having its ends received in openings 18 provided in the spaced legs of the U-shaped terminal portions 4 of the frame 1, see Fig. 3. The upper portions of the beater frame 17 are rigidly secured in the openings 18 by pinching pairs of ears 19 on the wire frame which ears 19 coact with the opposed faces of the U-shaped portions 4 to firmly secure the beater frame 17 against movement on the frame members 1. Before attaching the beater frame 17 to the main frame 1 as described above, each leg 17 receives a beater assembly consisting of a pair of beater elements 16 and one pinion 15, such a beater assembly being shown clearly in Fig. 3.

In making up a beater assembly, the end portions of the beater elements 16 are bent over and provided with an opening for receiving a hollow rivet 20 which also passes through an opening provided in a pinion 15. After the parts have been so assembled, the ends of the rivet 20 are peened over so that the beating elements 16 and driving pinion 15 form a unitary structure. With each beater assembly providing a unitary structure, it is an easy matter to position a pair of such assemblies on the spaced sides of the beater frame 17 after which the upper ends of the frame are inserted in the alined openings 18 provided in the opposed U-shaped portions 4 of the main frame 1. The ears 19 are then formed on the wire beater frame, thereby securing the frame 17 with the beater assemblies thereon. Each beater assembly is easily rotatable on the beater frame 17, the sides of the frame 17 being so spaced that the teeth 14 of the pinions 15 are in mesh, and the rotation of one pinion 15 by the large gear 11 serves to rotate the beater elements in unison.

From the foregoing, it is apparent that by the present invention there is provided an improved egg beater characterized by its simplicity, cheapness of manufacture and strength. The relatively wide spacing of the middle portions 3 of the frame members 1 provides separated bearing surfaces for the gear shaft 8, so that there will be no tendency for this shaft to wobble when the gear 11 is rotated rapidly. Furthermore, the U-shaped terminal portions 4 of the frame provide double bearings for the ends of the beater frame 17, thereby insuring its rigidity.

I claim:

In an egg beater, a frame comprising similar strip metal members each comprising a straight portion and a portion bent sidewise and terminating in a U-shaped portion, said frame members being secured together in opposed relation along their engaged straight portions and at the bases of their U-shaped portions, with said bent side portions spaced from each other.

2. In an egg beater, the combination with a frame comprising similar strip metal members each providing a straight portion and a portion bent sidewise and terminating in a U-shaped portion, said frame members being secured together in opposed relation along their engaged straight portions and at the bases of their U-shaped portions, with said bent side portions spaced apart from each other, of a shaft rotatably supported between said spaced side portions of the frame and carrying a gear meshing with one of a pair of meshing pinions mounted on the spaced legs of a beater holder with the upper ends of said legs received in said U-shaped portions, on opposite sides of their point of attachment.

SAMUEL T. HOBBS.